(12) United States Patent
Giuliani et al.

(10) Patent No.: US 9,003,704 B2
(45) Date of Patent: Apr. 14, 2015

(54) PROTECTION SYSTEM FOR CONTAINER TREATMENT MACHINES

(75) Inventors: Mattia Giuliani, Parma (IT); Marco Ferri, Parma (IT)

(73) Assignee: Sidel S.p.A., Parma (IT)

( * ) Notice: Subject to any disclaimer, the term of this patent is extended or adjusted under 35 U.S.C. 154(b) by 803 days.

(21) Appl. No.: 13/254,233

(22) PCT Filed: Mar. 4, 2009

(86) PCT No.: PCT/EP2009/052557
§ 371 (c)(1),
(2), (4) Date: Oct. 31, 2011

(87) PCT Pub. No.: WO2010/099822
PCT Pub. Date: Sep. 10, 2010

(65) Prior Publication Data
US 2012/0039692 A1  Feb. 16, 2012

(51) Int. Cl.
*B67C 3/22* (2006.01)
*F16P 1/02* (2006.01)
(Continued)

(52) U.S. Cl.
CPC ... *F16P 1/02* (2013.01); *B65C 9/00* (2013.01); *B65C 9/40* (2013.01); *B67C 3/007* (2013.01); *B67C 3/22* (2013.01); *F16P 3/02* (2013.01)

(58) Field of Classification Search
CPC .............. B25J 19/06; B66C 9/00; F16P 1/00; F16P 3/02; B65C 9/40; B67C 3/007
USPC .......... 49/163, 171, 348, 349, 360, 362, 413, 49/414, 415; 74/608, 609, 612; 100/349; 156/157; 160/118; 312/321.5; 422/568
See application file for complete search history.

(56) References Cited

U.S. PATENT DOCUMENTS 2,156,892 A *  5/1939  Field et al. ............. 156/86
3,988,980 A    11/1976  Walker
(Continued)

FOREIGN PATENT DOCUMENTS

DE  10 2005 041 531 A1  3/2007
EP      0 255 076 A1  2/1988
(Continued)

*Primary Examiner* — Saul Rodriguez
*Assistant Examiner* — Brendan Tighe
(74) *Attorney, Agent, or Firm* — Dickstein Shapiro LLP

(57) ABSTRACT

A protection system (7) for container treatment machine comprises a support frame (8) with a base frame (9) extending in a longitudinal direction parallel to a treatment path of containers and at least one individual support member (10) connected to the base frame (9), at least one individual protection panel (11), at least one individual guide means (12) configured to define a movement path of the individual protection panel (11) between a closure position and an opening position, at least one auxiliary positioning means (13) configured to apply an auxiliary force to the individual protection panel (11), said auxiliary force acting in the direction of said movement path against the force of gravity of the individual protection panel (11), wherein the guide means (12) movably connect the individual protection panel (11) to the individual support member (10) and the auxiliary positioning means (13) is interposed between the protection panel (11) and the support member (10) such as to form at least one individual panel-support-guide-positioning-module (14) adapted to be connected to said base frame (9) in an adjustable position along said longitudinal direction thereof.

19 Claims, 5 Drawing Sheets

Figure 1:
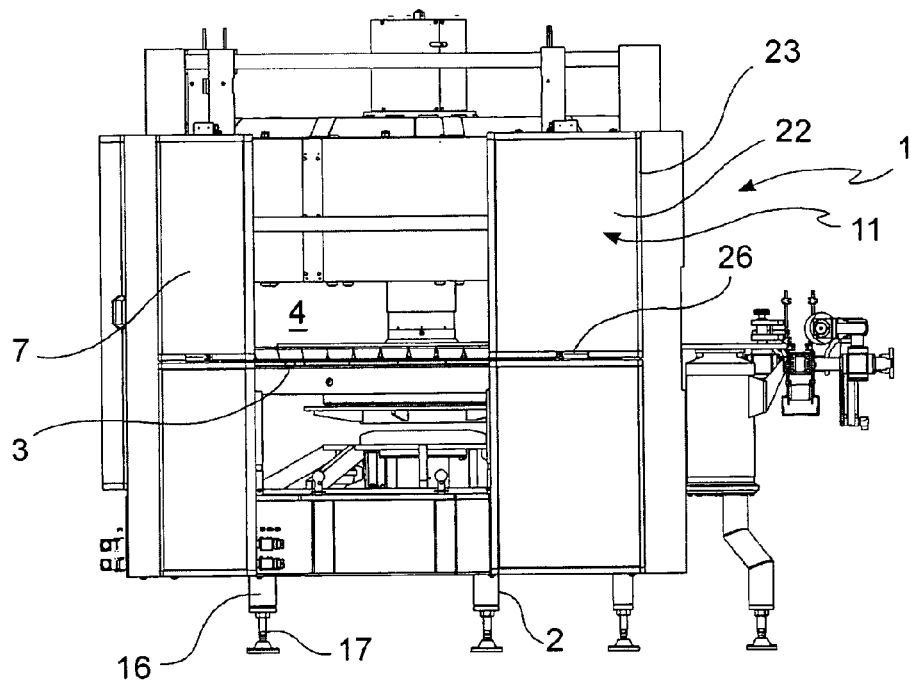

(51) Int. Cl.
*B65C 9/00* (2006.01)
*B65C 9/40* (2006.01)
*B67C 3/00* (2006.01)
*F16P 3/02* (2006.01)

(56) References Cited

U.S. PATENT DOCUMENTS 5,147,268 A * 9/1992 Cermeno .................. 493/38
5,992,101 A * 11/1999 Potter ..................... 52/79.7
6,922,944 B1 * 8/2005 Krueger ................... 49/171
2004/0099379 A1 * 5/2004 Erich ..................... 156/567
2005/0153427 A1 7/2005 Eder et al.
2007/0113991 A1 5/2007 Mangelsen et al.

FOREIGN PATENT DOCUMENTS

| EP | 0 842 734 A1 | 5/1998 |
| JP | S60-161796 U | 10/1985 |
| JP | 2003-185091 A | 7/2003 |

* cited by examiner

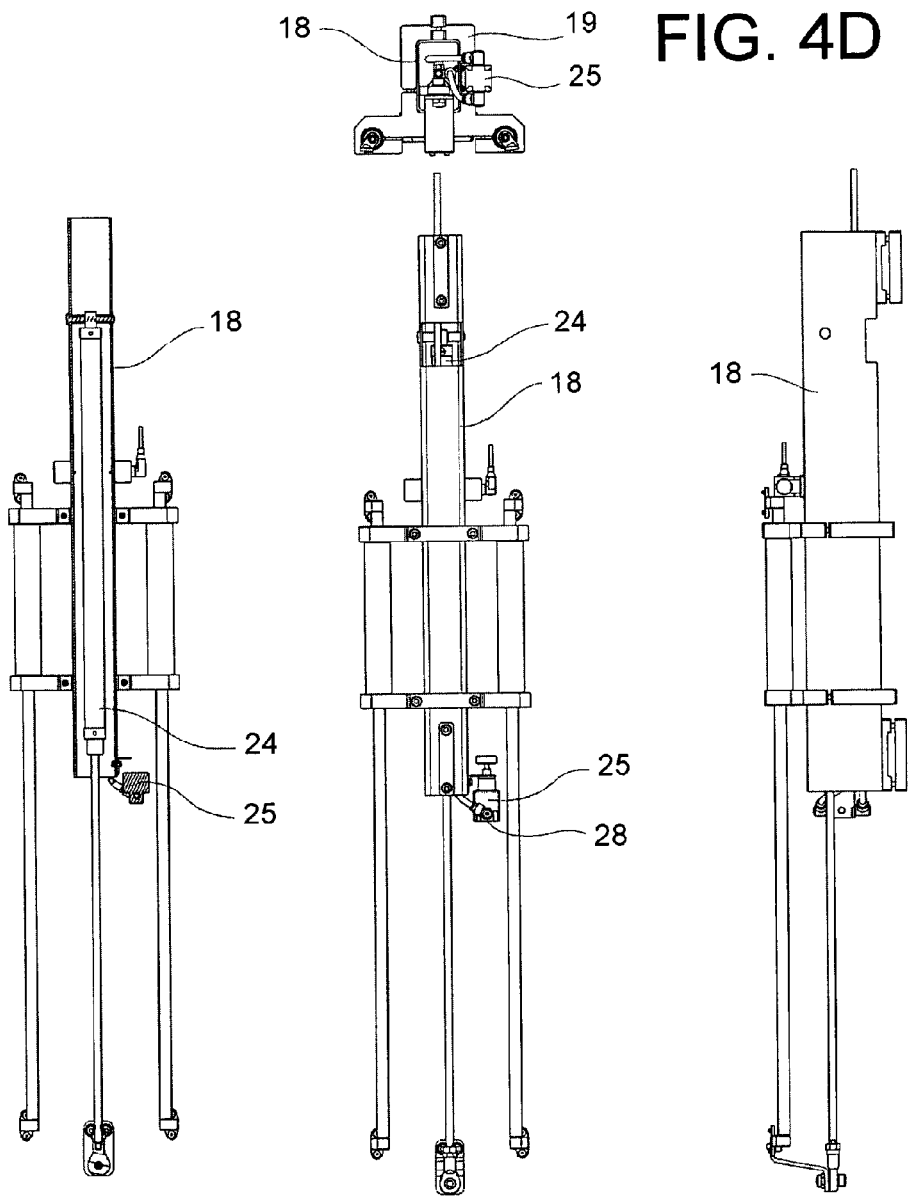

PROTECTION SYSTEM FOR CONTAINER TREATMENT MACHINES

The present invention relates to container treatment machines, particularly manufacturing or packaging or labeling machines, of the type comprising a support structure, a container moving device connected to the support structure and configured to carry containers to be treated along a container treatment path and one or more container treatment aggregates, e.g. manufacturing stations, labeling stations, filling stations, rinsing stations, container closure stations or auxiliary aggregates, arranged along the container treatment path and adapted to manipulate the containers or directly or indirectly contribute to the container manipulation.

In known manufacturing machines or stations, the containers, such as bottles, are done starting from intermediate hollow bodies named "preforms" or "parisons", which are treated (usually heated and blow-molded) to be transformed into containers. In the present description, the term "container" will be used indifferently to name finished containers or intermediate hollow bodies used for the manufacture of containers.

In order to avoid accidental access to an operating space of the container treatment machine during operation, the container treatment machine can be provided with a protection system which separates the operating space of the machine from the external environment. The known protection systems prevent the machine operator from accidentally entering the operating space of the container treatment machines and protect him from the internal machine environment. However, they must be at least partially movable or detachable from the container treatment machine in order to enable access to the machine operating space during maintenance and repair interventions when the container treatment machine is stopped.

A known protection system for container treatment machines comprises a support frame to which a plurality of protection panels, e.g. Plexiglas panels, are detachably connected which can be unmounted from the support frame in order to provide a more or less unobstructed access to the machine operating space during maintenance and repair interventions. In order to reduce the time necessary for unmounting and re-attaching the protection panels, some known protection systems comprise door or window panels which are hinged to the support frame and which can be locked in a closing position and opened into an opening position in order to reconcile the protective and access function of the protection system.

Yet other known protection systems employ sliding door or window protection panels which are slidably connected to the support frame and movable between an opening and closing position.

In order to alleviate the manual movement of the protection panels, automatic panel movement systems and panel counter-balance devices have been proposed which involve complex counterweights and mechanical balancing force transmissions.

The above discussed known solutions, apart from being mechanically complex and expensive become even less acceptable with the recent development of modular container treatment machines, e.g. modular manufacturing machines or modular labeling machines or modular filling machines, in which the position of one or more treatment aggregates along the container treatment path is likely to change many times during the lifetime of the container treatment machine. The known protection systems are not able to follow the trend towards modular container treatment machine concepts, since their inherent structural and functional lay-out would require a costly handmade adaptation every time the modular container treatment machine configuration is changed.

The aim of the present invention is therefore to provide a protection system for container treatment machines and a container treatment machine of the above indicated type having features which overcome at least part of the drawbacks cited with reference to the prior art.

Within the scope of the above aim, a particular aim of the present invention is to propose a protection system for container treatment machines which is less complex, less expensive and easily adaptable to modular variations of the container treatment machine lay-out.

According to an aspect of the invention, the above aim is achieved by a protection system for container treatment machines of the type comprising:
  a support structure,
  a container moving device connected to the support structure and configured to carry containers to be treated in an operating space along a container treatment path,
  one or more container treatment aggregates arranged along the container treatment path and adapted to manipulate the containers,
wherein said protection system comprises:
  a support frame comprising a base frame which can be arranged at said container treatment machine and which extends in a longitudinal direction, and at least one individual support member connected to said base frame and extending transversally to said longitudinal direction,
  at least one individual protection panel connected to said support frame and adapted to define a separation wall between said operating space and an external environment,
  at least one individual guide means configured to define a movement path of the individual protection panel between a closure position and an opening position thereof,
  at least one auxiliary positioning means configured to apply an auxiliary force to the individual protection panel, wherein said auxiliary force acts in the direction of said movement path against the force of gravity of said individual protection panel, wherein said guide means movably connect said individual protection panel to said individual support member and said auxiliary positioning means is interposed between said protection panel and said support member such as to form at least one individual panel-support-guide-positioning-module adapted to be connected to said base frame in an adjustable position along said longitudinal direction.

The individual panel-support-guide-positioning-module integrates the panel support-, guide- and positioning functions in a single unit and separates them structurally and functionally from the base frame so that the configuration of the separation wall can be easily adapted to variations of the container treatment machine by simply shifting the panel-support-guide-positioning-modules along the longitudinal direction of the base frame and fixing them in the desired position.

In this way, no handmade adaptation of the guide means and auxiliary positioning means is required, since their functional relationships with the panel and with the support member remain unchanged and they are automatically and correctly repositioned together with the entire panel-support-guide-positioning-module in which they are integrated.

In accordance with an aspect of the invention, the at least one panel-support-guide-positioning-module and particularly its support member is detachably connectable to the base frame, thereby enabling an easy substitution of individual panel-support-guide-positioning-modules with modules having e.g. different panel sizes, different movement paths or different protection properties.

In accordance with a yet further aspect of the invention which is in synergy with the above features, but which could be also advantageously applied to the initially described prior art protection systems, the auxiliary positioning means comprises a pneumatic cylinder-piston assembly and an adjustable pressure setting device arranged in the pneumatic feeding duct upstream a pressure chamber of the pneumatic cylinder, thereby enabling adjustment of the intensity of the auxiliary force in order to adapt it to the weight of the protection panel and/or to a desired manual force necessary to move the panel from the opening to the closure position and vice versa.

These and other objects and advantages of the present invention shall be made apparent from the accompanying drawings and the description thereof, which illustrate embodiments of the invention and, together with the general description of the invention given above, and the detailed description of the embodiments given below, serve to explain the principles of the present invention.

Figure 2:
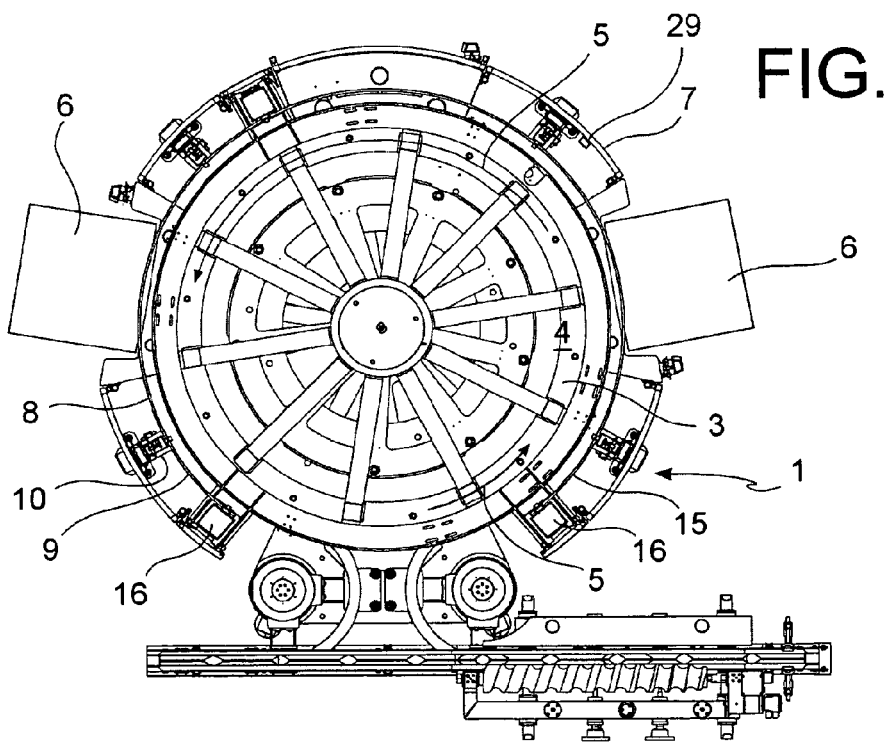
Figure 3:
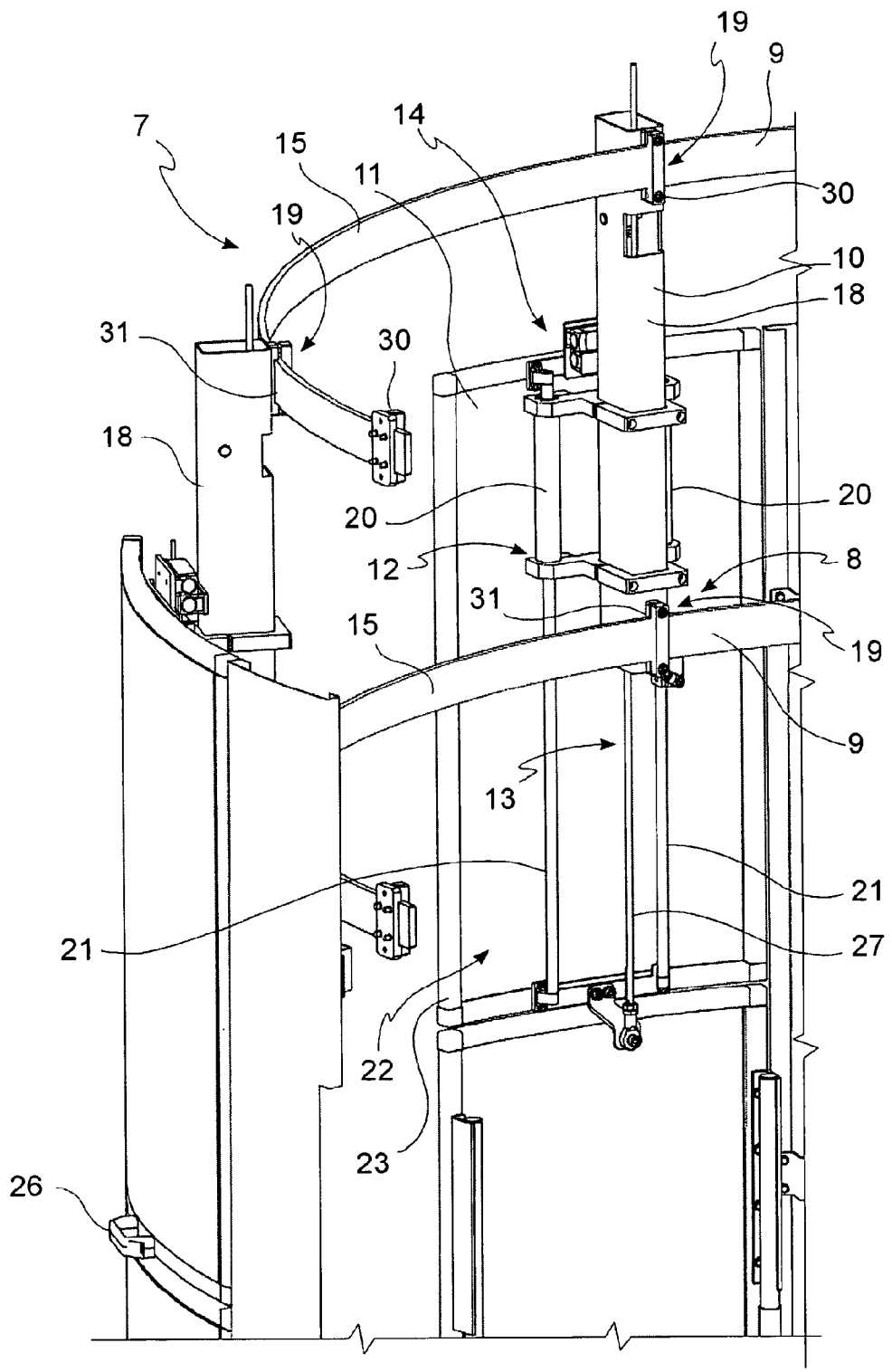
Figure 5A:
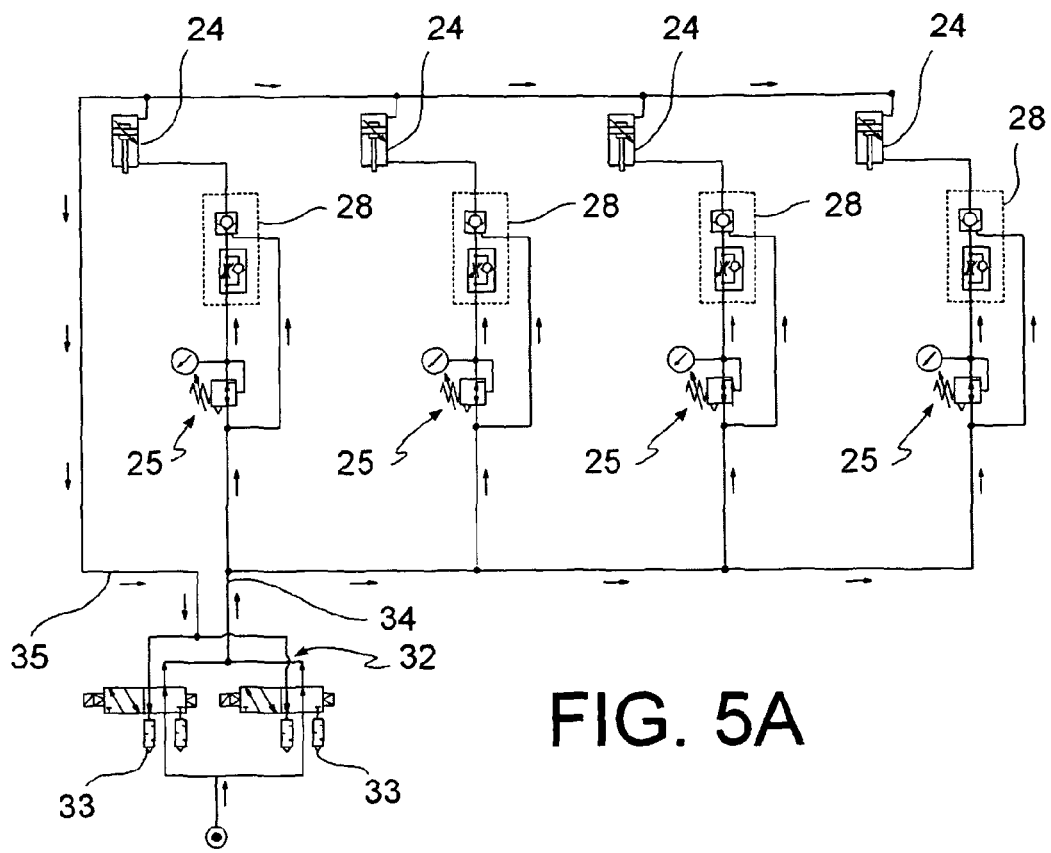
Figure 5B:
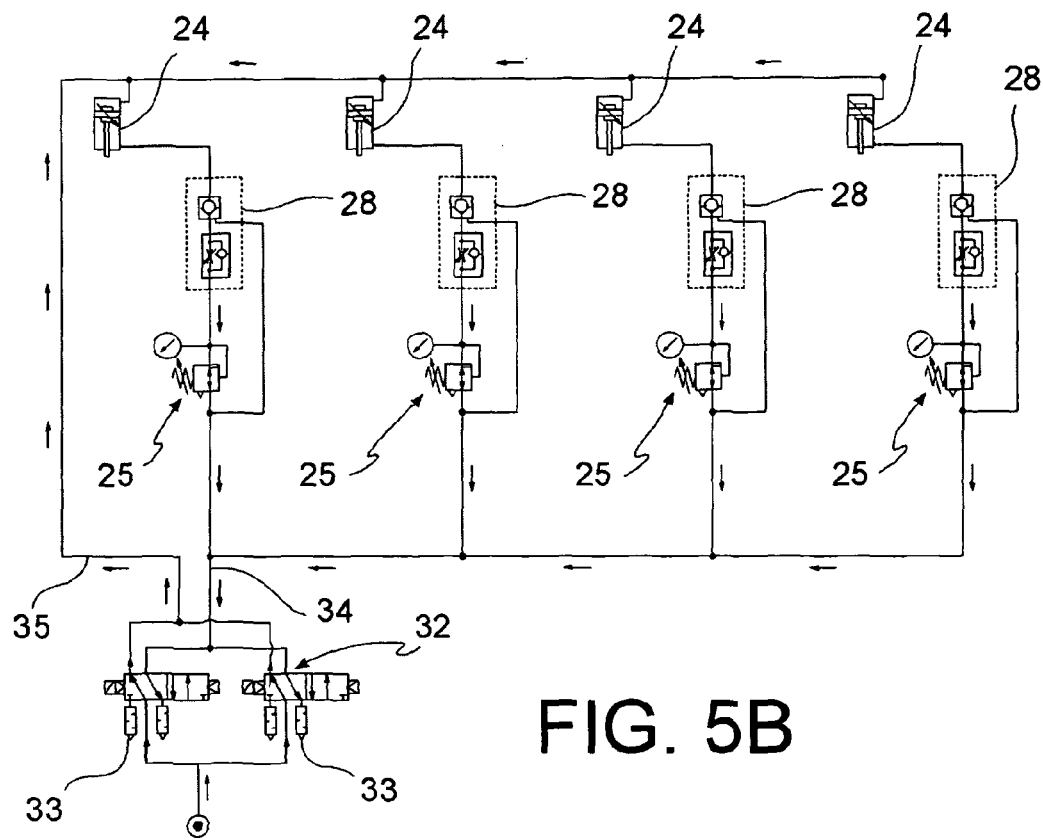
Figure 6:
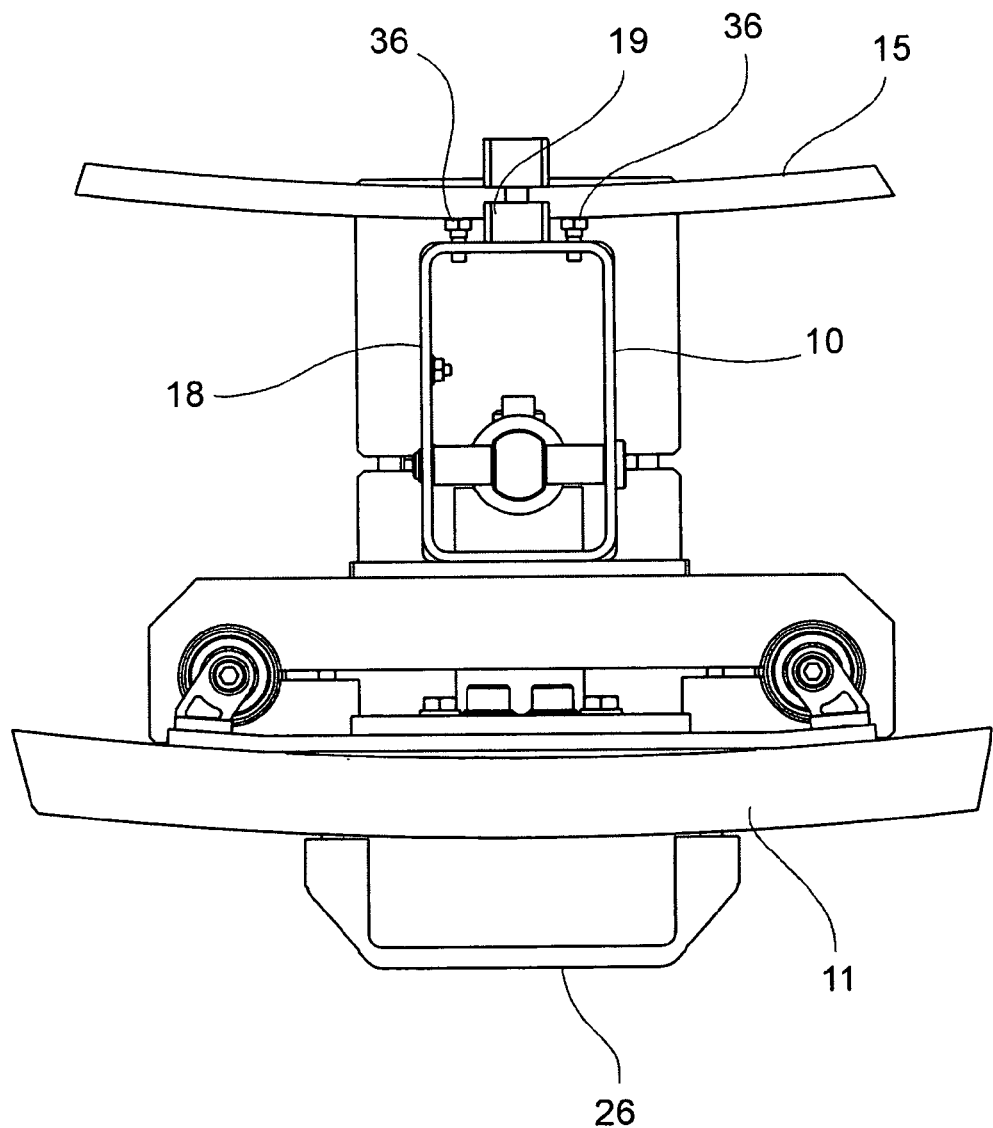

FIG. 1 is a schematic side view of a modular container labeling machine with a protection system according to an embodiment of the invention, FIG. 2 is a schematic top view of a modular container labeling machine with a protection system according to an embodiment of the invention, FIG. 3 illustrates a detail of the protection system in FIG. 1, shown from an internal operating space of the labeling machine, FIGS. 4A-4D are schematic side- and cross-sectional views of a detail of the protection system in accordance with an embodiment, FIGS. 5A and 5B show a schematic control scheme of auxiliary positioning means and pneumatic locking means of the protection system according to an embodiment in two working conditions, FIG. 6 illustrates a further detail of the protection system in accordance with an embodiment of the invention.

Referring to the drawings where like numerals denote like components throughout the several views, FIG. 1 depicts a container treatment machine 1, for instance a rotary bottle manufacturing machine, labeling machine, filling machine, rinsing machine or closure machine. The container treatment machine 1 may include a support structure 2, a container moving device 3, e.g. a carousel provided with a plurality of container holding plates, connected to the support structure 2 and configured to carry containers to be treated in an operating space 4 along a container treatment path 5. One or more container treatment aggregates 6 adapted to manipulate the containers, e.g. preform heating stations, labeling stations, filling stations, rinsing stations, container closure stations or auxiliary stations or modules, are arranged along the container treatment path 5. These aggregates 6 can be directly connected to the machine support structure 2 or free-standing with respect to the support structure 2 and they comprise manipulation organs, e.g. label application organs, transfer devices, which can protrude into the machine operating space 4 and interfere with the container treatment path 5 at least during the machine operation.

The container treatment machine 1 further comprises a protection system 7 adapted to isolate the operating space 4 of the machine 1 from an external environment in order to protect a machine operator from accidentally entering the operating space when the machine 1 is running and to prevent the machine operation from being disturbed or interrupted by external interferences. The protection system 7 comprises a support frame 8 having a base frame 9 which can be arranged at the container treatment machine 1, for instance connected to or integrated in the support structure 2 and which extends in a longitudinal direction, e.g. along an external circumference of a rotary labeling machine parallel to the circular treatment path 5 defined by the container moving device 3, when said device is a carousel or laterally along a linear treatment path on one or both sides of a linear container treatment machine, when the container moving device has another structure.

The support frame 8 further comprises at least one, preferably a plurality of individual support members 10 connected to the base frame 9 and extending transversally to the above-defined longitudinal direction.

One or more individual protection panels 11 are connected to the support frame 8 and configured to define a separation wall between the operating space 4 of machine 1 and an external environment.

The protection system 7 further comprises at least one individual guide means 12 (FIG. 3) configured to define a movement path of the individual protection panel 11 between a closure position and an opening position thereof and at least one auxiliary positioning means 13 configured to apply an auxiliary force to the individual protection panel, wherein the auxiliary force acts in the direction of the movement path against the force of gravity of the individual protection panel 11.

In accordance with one aspect of the invention, the guide means 12 connect the individual protection panel 11 to at least one respective individual support member 10 so that the protection panel 11 can translate and/or rotate with respect to this respective support member 10. Moreover, the auxiliary positioning means 13 is interposed between the protection panel 11 and the support member 10 in order to apply the auxiliary force to the panel 11 and the corresponding reaction force to the support member 10.

In this way, at least one individual panel-support-guide-positioning-module 14 (in the following referred to as "module 14") is provided which forms a structurally and functionally independent unit adapted to be connected with the base frame 9 in an adjustable position along the above-mentioned longitudinal direction parallel to the treatment path 5 defined by the container moving device 3.

In accordance with an embodiment, the base frame 9 comprises at least one, preferably two substantially parallel longitudinal beams 15 which are arranged at a (preferably vertical) distance from one another and extend in the longitudinal direction parallel to the treatment path 5 defined by the container moving device 3 in order to provide a substantially continuous or interrupted continuous connection surface for the adjustable fixation of the support members 10 of the modules 14. Thanks to the distance between both longitudinal beams 15, the modules 14 can be locked in a rotation proof and translation proof manner.

The longitudinal beam or beams 15 can be directly connected, e.g. screwed, bolted or welded to the machine support structure 2 or, alternatively, the base frame 9 may comprise a plurality of posts 16 with height adjustable feet 17 adapted to abut on the floor or to be connected to the machine support structure 2. In accordance with a preferred embodiment, the longitudinal beams 15 are at least partially arch- or ring shaped and adapted to extend at least partially along an outer circumference of a rotary container treatment machine, e.g. rotary labeling machine.

The base frame 9 may be further configured so that the longitudinal beam or beams 15 extend above (or below) the vertical extension of the operating space 4 of the container treatment machine 1, so that they do not obstruct the access to the operating space when the protection panels 11 are in their opening position.

In accordance with an embodiment, the individual support member 10 of the module 14 comprises a preferably hollow section upright 18 with module coupling means 19 configured to be slidable in the longitudinal direction of the base frame 9, specifically of the longitudinal beams 15, and firmly connectable thereto in several longitudinal positions or, preferably, in any desired longitudinal position.

The module coupling means 19 may comprise c-shaped brackets welded to the upright 18 to define a coupling seat 31 for receiving and at least partially embracing the longitudinal beam 15 to correctly define the relative position and orientation between the base frame 9 and the module 14 and screw tightening means 30 configured to firmly lock the longitudinal beam 15 in the coupling seat 31.

The module coupling means can further include position adjustment means suitable to adjust the orientation of upright 18 with respect to longitudinal beam 15. In accordance with the non limiting example illustrated in FIG. 6, the position adjustment means comprise two adjustment screws 36 adjustably received in threaded holes arranged on both sides of coupling seat 31 (e.g. C-shaped bracket) and suitable to abut against the longitudinal beam 15 in adjustable contact points.

In accordance with one embodiment, the module coupling means 19 are provided at the upright 18 in a position such that the encumbrance of the upright (or, more generally spoken, the encumbrance of the individual support member 10) is outside (above or below) the operating space and preferably overlapping the encumbrance of the longitudinal beams 15.

Preferably, the uprights 18 extend substantially vertically and both the longitudinal beams 15 and the uprights 18 of the modules 14 are arranged completely above the operating space 4 of the container treatment machine 1. Such a configuration provides a completely free access to the operating space 4 when the protection panel 11 is also lifted above the operating space 4 in its opening position.

In accordance with an aspect of the invention, the at least one module 14 and particularly its support member 10 is detachably connectable to the base frame 9, thereby enabling an easy substitution of individual modules 14 with modules having e.g. different panel sizes or shapes, different movement paths or different protection properties.

To this end, the coupling seats 31 of the uprights 18 are preferably configured to be detachable from the longitudinal beams 15, e.g. by opening the screw tightening means 30.

In accordance with an alternative embodiment, the longitudinal beams 15 are connectable to anti-torque columns of the container treatment machine which rotationally lock an upper machine portion, e.g. an upper portion of a container carrying carousel, with respect to a lower portion thereof, thereby obviating the need of dedicated individual support members 10.

The guide means 12 may comprise at least one, preferably two parallel tubular guides 20 which extend in the direction of the panel movement path and which are rigidly connected with the support member 10 (particularly with upright 18), as well as corresponding guided rods 21 extending in the direction of the panel movement path and slidingly received in the tubular guides 20. The guided rods 21 are preferably connected with both opposite end portions to the protection panel 11.

In accordance with an embodiment, the guide means extend upright, preferably substantially vertically, so that the protection panels 11 can be lifted and lowered between a lower and upper end of stroke position.

Preferably, the guide means are configured in a way that when the protection panel 11 is held in the opening position, its vertical encumbrance overlaps with the vertical encumbrances of the uprights 18 and longitudinal beams 15 and is located above and outside the vertical extension of the operating space 4.

The protection panel 11 is preferably substantially rectangular and might be curved or bent in order to better adapt to the shape of the container treatment machine 1. The protection panel 11 preferably comprises a transparent inner panel 22, e.g. made of Plexiglas, bordered and stabilized by an outer framing 23 to which the guide means and auxiliary positioning means are connected.

A handle 26 for manually moving the protection panel 11 between the opening and closure position can also be provided at the outer framing 23.

In accordance with a yet further aspect of the invention which is particularly advantageous in combination with the above described features, but which could be also advantageously applied to the prior art protection systems described in the introduction, the auxiliary positioning means 13 comprises a pneumatic cylinder-piston assembly 24 and a manually adjustable pressure setting device 25 arranged in a pneumatic feeding duct upstream a first pressure chamber of the pneumatic cylinder-piston assembly 24, thereby enabling manual adjustment of the intensity of the auxiliary force in order to adapt it to the weight of the protection panel 11 and/or to a desired manual force necessary to move the panel 11 from the opening to the closure position and vice versa.

The machine operator or the machine installer can manually adjust the pressure setting device 25 to exactly counterbalance the weight of the panel 11, so that manual displacement of the panel 11 requires substantially zero force.

In accordance with an embodiment, the pneumatic cylinder-piston assembly 24 is mounted inside the hollow upright 18 and a force transmission rod 27 has a first end connected to the piston of cylinder-piston assembly 24 and a second end connected to panel 11, preferably to the outer framing 23 thereof.

The manually adjustable pressure setting device 25 is configured to automatically reestablish the set pressure in the first pressure chamber (lower pressure chamber) of the pneumatic cylinder and, hence, the auxiliary force acting on panel 11, also when the panel 11 and, hence, the pneumatic piston have been moved.

The auxiliary positioning means 13 may additionally comprise a safety valve 28 arranged in the pneumatic feeding duct upstream the pressure setting device 25 and configured to automatically close the pneumatic air feeding duct in case the air pressure drops upstream the safety valve 28.

FIG. 5 illustrates a possible pneumatic control scheme of the protection system, wherein the additional numerical reference sign 32 denotes a general solenoid valve of the pneumatic circuit and reference signs 33 denote air exhausts.

In accordance with an advantageous embodiment, solenoid valve 32 is piloted dependent from the operating state of the container treatment machine and comprises:

a first outlet connected through a first air feeding duct 34 with the safety valve 28 and pressure setting device 25 to feed the above said first (lower) pressure chamber to counter-balance the weight of the panel 11;

and a second outlet connected through a second air feeding duct 35 with a second (upper) pressure chamber of the pneumatic cylinder-piston assembly 24 to feed the second (upper) pressure chamber with the effect that the pneumatic cylinder-piston assembly 24 actively pushes and locks the protection panel 11 in its closed position.

Valve 32 is configured to selectively feed the first air duct 34 and lower pressure chamber of the pneumatic cylinder-piston assembly 24 during a machine standstill (FIG. 5A) and to selectively feed the second air duct 35 and upper pressure chamber of the pneumatic cylinder-piston assembly 24 when the container treatment machine is operating, thereby preventing opening, e.g. lifting of the protection panels 11 (FIG. 5B).

In accordance with a yet further embodiment of the invention, the protection system 7 comprises sensor means 29 in signal communication with a control unit of the container treatment machine 1 and configured to generate a warning signal when a protection panel 11 is moved or displaced away from its closed position, so that the machine 1 control unit can immediately interrupt the machine operation to avoid accidents or damage of the container treatment machine 1.

The sensor means 29 may comprise a magnetic micro-switch connected to an electrical control circuit and a ferrous or magnetic field reference element connected to the panel 11, such that a variation of the relative position of the magnetic micro-switch and the reference element generate the above said warning signal.

Advantageously, the micro-switch or more generally the sensor means 29 is connected to the module 14, preferably to the support member 10 thereof so that a variation of the position of the entire module 14 doesn't influence the correct functioning of the sensor means 29.

In order to enable adaptation of the sensor means 29 to programmed variations of the protection panel closing position, the sensor means (sensible element and/or reference element or, with reference to the specific example, the magnetic micro-switch and/or the ferrous or magnetic field reference element) is position-adjustably connected with the panel 11 and/or support member 10 of module 14.

With reference to the exemplary non limiting embodiment of a modular rotary labeling machine, the position of the single modules 14 can be easily adapted along the outer circumference (longitudinal direction parallel to the treatment path 5 defined by the container moving device 3) of the labeling machine and the single panels 11 can be lifted from a lower closure position to an upper opening position enabling free unobstructed access to the machine operating space 4 during repair and maintenance interventions. The space required for the modular or fixed treatment aggregates can be provided by longitudinally sliding and repositioning or removing of one or more individual modules 14. Modular interchange of different modules 14 is possible thanks to the detachable coupling seats of these modules.

Moreover, the protection system according to the invention makes it possible and is configured to cover selectable circumferential cover sections of the container treatment machine so that one or more circumferential access sections of selectable position and circumferential extension remain uncovered to allow access of the container treatment aggregates, e.g. preform heating stations, labeling modules, to the machine operating space 4. According to the invention, auxiliary protection panels can be directly connected to the container treatment aggregates and configured to cover gaps between the protection panels 11 and the container treatment aggregates 6 or otherwise uncovered access space beneath and above the container treatment aggregates 6 in the circumferential access sections.

In this way, the present invention obviates the need of precisely cutting access apertures in the protection panels, as is the case with prior art protection systems.

Last but not least, the movement of the protection panels 11 along their predetermined movement path is assisted by adjustably counter-balancing the panel weight without any need of complex mechanical balancing devices.

From the foregoing detailed disclosure of embodiments, those skilled in the art will appreciate that the protection system and the container treatment machine containing the protection system are particularly versatile and modularly adaptable to variations of the container treatment machine lay-out and, at the same time, mechanically simpler, more reliable, sturdier and less expensive than prior art protection systems.

While the present invention has been illustrated by description of several embodiments and while the illustrative embodiments have been described in considerable detail, it is not the intention to restrict or in any way limit the scope of the appended claims to such detail.

The invention claimed is:

1. A protection system for container treatment machine of the type comprising:
    a support structure,
    a container moving device connected to the support structure and configured to carry containers to be treated in an operating space along a container treatment path,
    one or more container treatment aggregates arranged along the container treatment path and adapted to manipulate the containers,
    wherein said protection system comprises:
    a support frame comprising a base frame which can be arranged at said container treatment machine and which extends in a longitudinal direction parallel to the treatment path, and at least one individual support member connected to said base frame,
    at least one individual protection panel adapted to define a separation wall between said operating space and an external environment,
    at least one individual guide means configured to define a movement path of said individual protection panel between a closure position and an opening position thereof,
    at least one auxiliary positioning means configured to apply an auxiliary force to said individual protection panel, said auxiliary force acting in the direction of said movement path against the force of gravity of said individual protection panel,
    wherein said guide means movably connect said individual protection panel to said individual support member and said auxiliary positioning means is interposed between said protection panel and said support member such as to form at least one individual panel-support-guide-positioning-module adapted to be connected to said base frame in an adjustable position along said longitudinal direction,
    wherein said individual support member of said module comprises an upright with module coupling means configured to be shiftable in said longitudinal direction parallel to the treatment path of the base frame and firmly connectable thereto in several longitudinal positions.

2. A protection system according to claim 1, wherein said at least one module is detachably connectable to the base frame.

3. A protection system according to claim 1, wherein the base frame comprises two substantially parallel longitudinal beams extending in said longitudinal direction parallel to the treatment path and providing substantially continuous connection surfaces for an adjustable fixation of said support members of said modules.

4. A protection system according to claim 1, in which said module coupling means comprises screw tightening means for locking the position of said upright with respect to said base frame.

5. A protection system according to claim 1, wherein said guide means comprises two parallel tubular guides rigidly connected with said support member as well as corresponding guided rods slidingly received in the tubular guides and having two opposite ends connected to said protection panel.

6. A protection system according to claim 1, wherein said guide means extend upright so that the protection panels can be lifted and lowered between a lower and upper end of stroke position.

7. A protection system according to claim 1, wherein said protection panel comprises a transparent inner panel bordered by an outer framing to which said guide means and auxiliary positioning means are connected.

8. A protection system according to claim 1, wherein said auxiliary positioning means comprises a pneumatic cylinder-piston assembly and a manually adjustable pressure setting device arranged in the pneumatic feeding duct of said pneumatic cylinder-piston assembly, said manually adjustable pressure setting device being configured to enable manual adjustment of a pneumatic pressure in said pneumatic cylinder-piston assembly such as to adjust the intensity of said auxiliary force.

9. A protection system according to claim 8, wherein said pneumatic cylinder-piston assembly is mounted inside said upright and a force transmission rod connects a piston of cylinder-piston assembly to said protection panel.

10. A protection system according to claim 8, wherein said manually adjustable pressure setting device is configured to automatically reestablish the set pressure in the pneumatic cylinder-piston assembly when the panel is moved along said movement path.

11. A protection system according to claim 8, comprising a safety valve arranged in the pneumatic feeding duct upstream the pressure setting device and configured to automatically close the pneumatic feeding duct in case the air pressure drops upstream said safety valve.

12. A protection system according to claim 1, comprising a pneumatic locking means configured to push and lock the protection panel in its closed position when the container treatment machine is operating.

13. A protection system according to claim 1, comprising sensor means fixed to said modules and connectable in signal communication with a control unit of the container treatment machine, said sensor means being configured to generate a warning signal when a protection panel is moved or displaced away from its closed position.

14. A protection system according to claim 13, in which said sensor means are configured to respond to movements of said protection panel with respect to said support member of said individual module such that, when the entire module is displaced, said sensor means maintains its configuration.

15. A container treatment machine comprising:
a support structure,
a container moving device connected to the support structure and configured to carry containers to be treated in an operating space along a container treatment path,
one or more container treatment aggregates arranged along the container treatment path and adapted to manipulate the containers,
a protection system, wherein said protection system comprises:
a support frame comprising a base frame which can be arranged at said container treatment machine and which extends in a longitudinal direction parallel to the treatment path, and at least one individual support member connected to said base frame,
at least one individual protection panel adapted to define a separation wall between said operating space and an external environment,
at least one individual guide means configured to define a movement path of said individual protection panel between a closure position and an opening position thereof,
at least one auxiliary positioning means configured to apply an auxiliary force to said individual protection panel, said auxiliary force acting in the direction of said movement path against the force of gravity of said individual protection panel,
wherein said guide means movably connect said individual protection panel to said individual support member and said auxiliary positioning means is interposed between said protection panel and said support member such as to form at least one individual panel-support-guide-positioning-module adapted to be connected to said base frame in an adjustable position along said longitudinal direction, and
wherein said individual support member of said module comprises an upright with module coupling means configured to be shiftable in said longitudinal direction parallel to the treatment path of the base frame and firmly connectable thereto in several longitudinal positions.

16. A container treatment machine according to claim 15, being a rotary machine comprising a carousel, wherein the base frame comprises two substantially parallel longitudinal beams extending in said longitudinal direction parallel to the treatment path and providing substantially continuous connection surfaces for an adjustable fixation of said support members of said modules, wherein said longitudinal beams are at least partially arch- or ring shaped and adapted to extend at least partially along an outer circumference of said rotary machine.

17. A container treatment machine according to claim 16, wherein said longitudinal beams and said support members extend above the vertical extension of the operating space of said container treatment machine and said guide means are configured so that, when said protection panel is held in the opening position, said panel is located above and outside the vertical extension of said operating space.

18. A protection system for container treatment machine of the type comprising:
a support structure,
a container moving device connected to the support structure and configured to carry containers to be treated in an operating space along a container treatment path,
one or more container treatment aggregates arranged along the container treatment path and adapted to manipulate the containers,
wherein said protection system comprises:
a support frame comprising a base frame which can be arranged at said container treatment machine and which extends in a longitudinal direction parallel to the treatment path, and at least one individual support member connected to said base frame, at least one individual protection panel adapted to define a separation wall between said operating space and an external environment, at least one individual guide means configured to define a movement path of said individual protection panel between a closure position and an opening position thereof, at least one auxiliary positioning means configured to apply an auxiliary force to said individual protection panel, said auxiliary force acting in the direction of said movement path against the force of gravity of said individual protection panel, wherein said guide means movably connect said individual protection panel to said individual support member and said auxiliary positioning means is interposed between said protection panel and said support member such as to form at least one individual panel-support-guide-positioning-module adapted to be connected to said base frame in an adjustable position along said longitudinal direction, sensor means fixed to said modules and connectable in signal communication with a control unit of the container treatment machine, said sensor means being configured to generate a warning signal when a protection panel is moved or displaced away from its closed position, said sensor means being further configured to respond to movements of said protection panel with respect to said support member of said individual module such that, when the entire module is displaced, said sensor means maintains its configuration.

19. A container treatment machine comprising:

a support structure, a container moving device connected to the support structure and configured to carry containers to be treated in an operating space along a container treatment path, one or more container treatment aggregates arranged along the container treatment path and adapted to manipulate the containers, a protection system, wherein said protection system comprises:

a support frame comprising a base frame which can be arranged at said container treatment machine and which extends in a longitudinal direction parallel to the treatment path, and at least one individual support member connected to said base frame, at least one individual protection panel adapted to define a separation wall between said operating space and an external environment, at least one individual guide means configured to define a movement path of said individual protection panel between a closure position and an opening position thereof, at least one auxiliary positioning means configured to apply an auxiliary force to said individual protection panel, said auxiliary force acting in the direction of said movement path against the force of gravity of said individual protection panel, wherein said guide means movably connect said individual protection panel to said individual support member and said auxiliary positioning means is interposed between said protection panel and said support member such as to form at least one individual panel-support-guide-positioning-module adapted to be connected to said base frame in an adjustable position along said longitudinal direction, sensor means fixed to said modules and connectable in signal communication with a control unit of the container treatment machine, said sensor means being configured to generate a warning signal when a protection panel is moved or displaced away from its closed position, said sensor means being further configured to respond to movements of said protection panel with respect to said support member of said individual module such that, when the entire module is displaced, said sensor means maintains its configuration.

\* \* \* \* \*